Oct. 4, 1955     C. E. STOLTZ     2,719,617
REVERSING MECHANISM FOR USE WITH TORQUE CONVERTER DRIVES
Filed Dec. 17, 1951     2 Sheets-Sheet 1
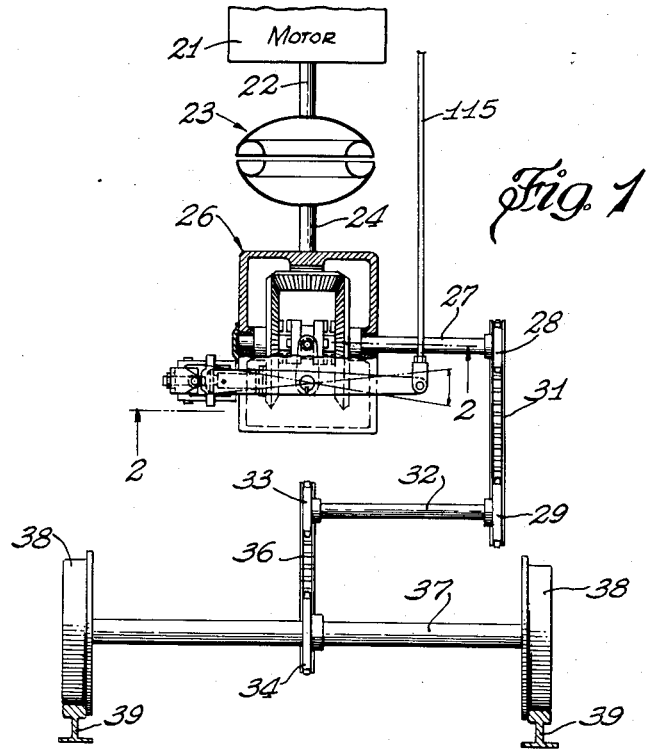
Fig. 1
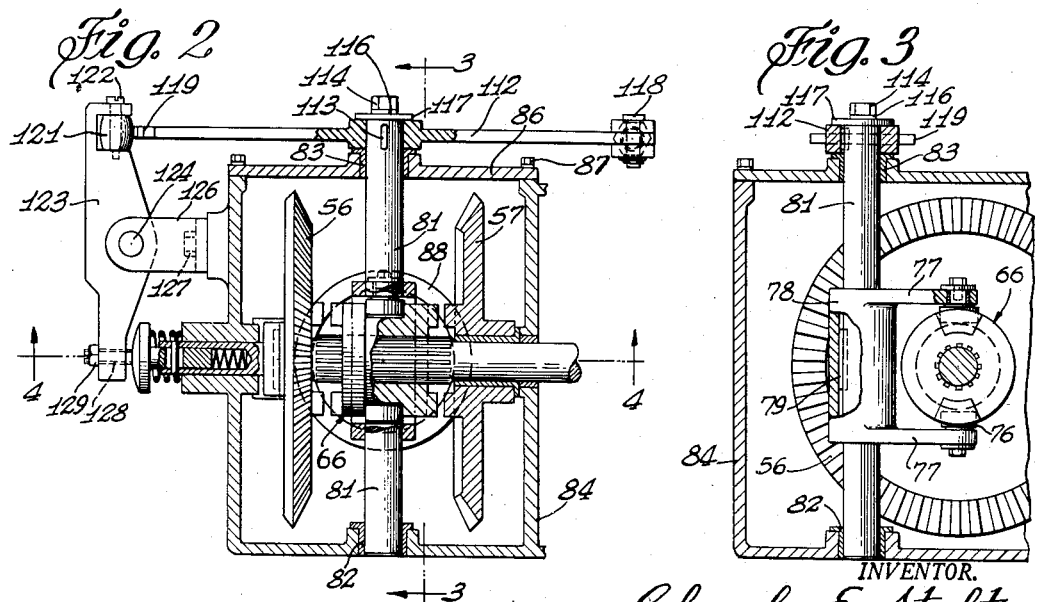
Fig. 2
Fig. 3
INVENTOR.
Charles E. Stoltz
BY
Murray G. Gleeson
ATTORNEY

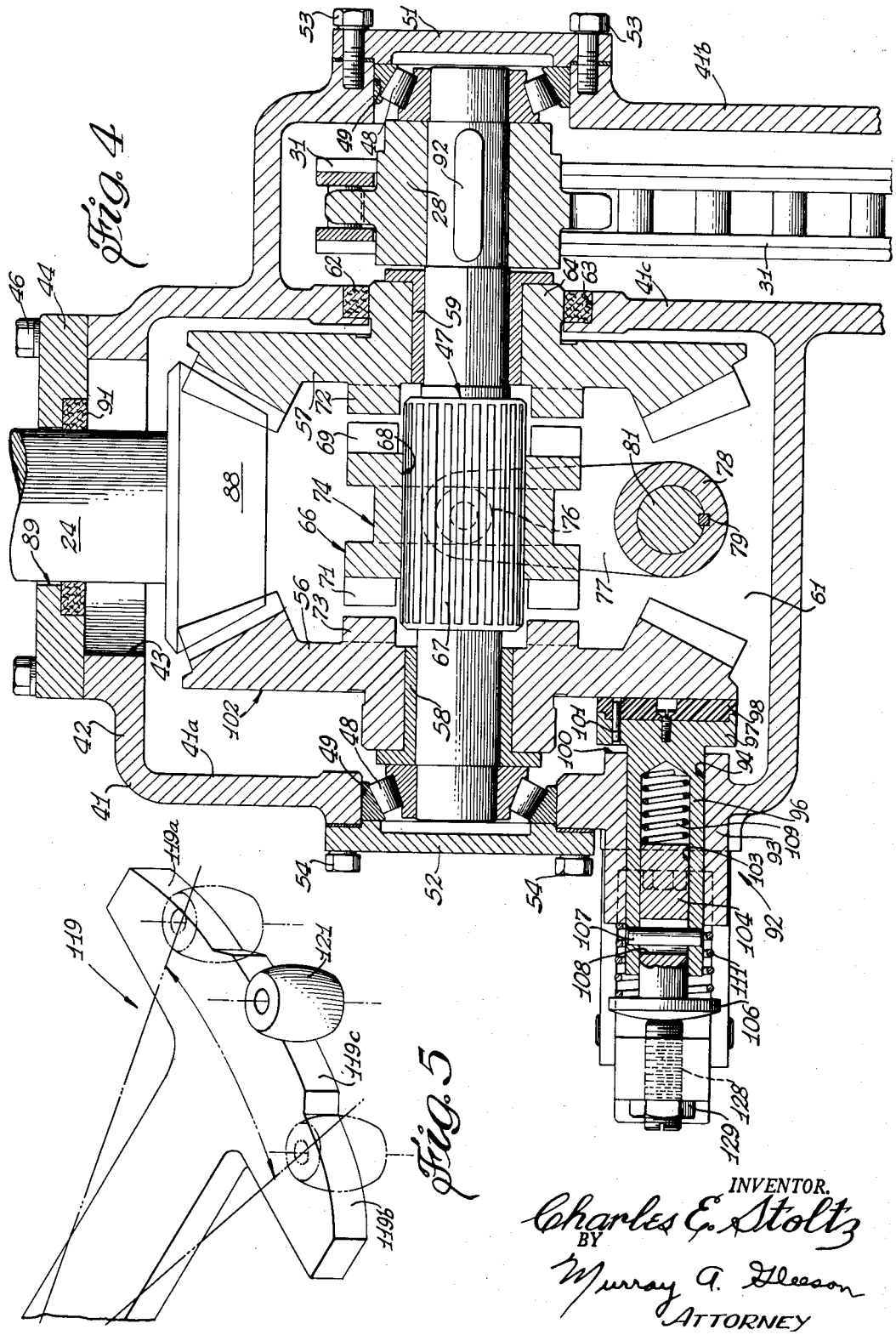

United States Patent Office 2,719,617
Patented Oct. 4, 1955

2,719,617

REVERSING MECHANISM FOR USE WITH TORQUE CONVERTER DRIVES

Charles E. Stoltz, Chicago, Ill., assignor to Goodman Manufacturing Company, Chicago, Ill., a corporation of Illinois Application December 17, 1951, Serial No. 262,089

4 Claims. (Cl. 192—4)

This invention relates generally to torque converter or fluid coupling drives and particularly to an improved reversing mechanism for use with torque converter drives of the type which may be employed for tramming small mine locomotives and similar vehicles.

This invention has for its primary object the provision of a simple and inexpensive reversing mechanism for torque-converter-trammed vehicles in which reversal may be carried out smoothly and silently without clashing.

In a torque conversion system there is an engine or motor which drives a vane-type fluid coupling which in turn drives the vehicle wheels through a suitable reversing mechanism. It has been customary in the past to have a multi-plate clutch between the motor and torque converter and to provide means for releasing the clutch prior to reversing in order to effect reversal without clashing. The facts that this multi-plate clutch is expensive and takes up valuable space are distinct disadvantages for underground mining locomotives which must be both cheap and compact. As a major feature of the present invention, it has been found possible, and therefore doubly advantageous, to substitute for the aforesaid conventional multi-plate clutch, a simple brake applied to one of the gears of the reversing mechanism. The brake and reversing mechanism will preferably be operated concurrently by the same lever, for one-hand automatic operation. This works extremely satisfactorily for small to medium size locomotives and is both cheap and compact.

Other objects and advantages of the present invention will be pointed out in the following description taken in connection with the drawings in which:

Figure 1 is a diagrammatic view showing the improved reversing mechanism as applied to a locomotive tramming system;

Figure 2 is an enlarged fragmentary cross-sectional view of Fig. 1 taken along the line 2—2;

Figure 3 is a cross-sectional view of Fig. 2 taken along the line 3—3;

Figure 4 is a further enlarged cross-sectional view, taken along line 4—4 of Fig. 2; and Figure 5 is an enlarged fragmentary perspective view of one form of lever and cam arrangement employed.

Like parts are designated by like reference characters throughout the views of the drawings.

In Fig. 1, the major elements of the tramming drive with which the invention is illustrated include a motor 21 connected through a shaft 22 to drive a vane-type fluid coupling or torque converter 23, which in turn is connected through a driving shaft 24 to a reversing mechanism generally designated 26. The latter has an output or driven shaft 27 carrying a sprocket 28 which drives another sprocket 29 through a chain 31. A shaft 32, which is driven by the sprocket 29, has another sprocket 33 driving sprocket 34 through a chain 36. Sprocket 34 is mounted on the locomotive axle 37 to drive the flanged wheels 38, 38 along rails 39, 39.

As shown in the succeeding views of the drawing, the reversing mechanism 26 includes a casing 41 having end walls 41a and 41b and an intermediate wall 41c. Another wall, indicated 42 in Fig. 4 has an opening 43 closed by cover 44 held on by cap screws 46. Within the housing 41 is rotatably journaled a driven shaft 47. This shaft is supported in bearings 48, 48 seated in bores 49, 49 in opposite walls of the casing. These bores are closed by cover plates 51 and 52 held in place by cap screws 53 and 54, respectively.

A pair of crown or bevel gears 56 and 57 are spaced apart within the housing and independently rotatably journaled on shaft 47, through flanged combined sleeve and thrust bearings 58 and 59, respectively. The gear chamber 61 is oil-sealed by a seal 62 seated in a bore 63 of wall 41c and resiliently embracing the extension 64 of gear 57.

A jaw clutch member 66 is reciprocably splined on shaft 47 and movable into engagement with either gear 56 or 57, or neither. An intermediate portion of the shaft 47 is formed with a series of straight splines 67 which engage a similarly splined inner bore 68 of the clutch. Opposite faces of the clutch contain jaws or teeth 69 and 71 which in turn are engageable with corresponding jaws or teeth 72 and 73 of the gears. The clutch is formed with an exterior groove 74 for receiving rollers 76, 76 supported by the arms 77, 77 of yoke 78 which is keyed as at 79 to a shifter shaft 81. As shown in Figs. 2 and 3, the latter is journaled for limited rotational movement in bearings 82 and 83 supported in opposite walls 84 and 86, respectively. Wall 86, as shown, is separable, being held in place by cap screws 87.

A beveled pinion 88, on the end of driving shaft 24, is meshed with the two gears 56 and 57 and serves to interconnect them for rotation in opposite directions. The shaft 24 extends through a bore 89 in plate 44 and a grease seal 91 is provided surrounding the shaft 24.

A brake mechanism, generally designated 92, is provided to engage the backside of gear 56. More specifically, this structure includes a tubular boss 93 formed in housing wall 41a and having an internal bore 94, within which is reciprocably guided a brake stem 96 having an inner head 97 to which a frictional disc 98 is attached by means of screw 99 and dowel 101. The friction face 98 is adapted to engage, flatwise, the back surface 102 of gear 56. This back surface is preferably machined and polished smooth.

The interior of stem 96 is formed with a bore 103 within which is telescopically assembled an extension 104 having a head 106. Telescopical movement of elements 96—106 is limited by pin 107 which is mounted in the stem 96 and passes through an elongated slot 108 in the extension. Thus, there is a certain amount of in and out movement of the extension 104 relative to the stem, but as limited by the length of the slot 108.

The arrangement of Fig. 4 shows the brake in the "applied" condition, where it will be noted that the pin 107 is about midway within the elongated slot 108. It will also be observed that brake load applied to the head 106 of the extension is not transmitted directly to the friction element 98 but indirectly by way of the compression spring 109 which is interposed between the stem 96 and the inner end of its extension 104. It will also be observed that another compression spring 111 is interposed between the head 106 and the end of the tubular housing portion 93 for the purpose of releasing the brake when the load is removed, as will be seen in the subsequent description.

The position of the jaw clutch 66 in Fig. 4 is "neutral" since it is not engaged with either one of the gears 56 or 57 and, hence, power will not be transferred to the locomotive wheels in either direction. With the motor 21 idling there will be a small amount of fluid transferred between the vanes of the torque converter 23 so that, even under idling conditions, there will be some torque applied to the input shaft 24. Without the brake 92 the input pinion 88 would thus spin the gears 56 and 57 when the clutch 66 is in the Fig. 4 or "neutral" position. Subsequent movement of the clutch to engage one or the other of the gears or "forward" or "reverse" operation would be accompanied by serious clashing of the teeth 69—72 or 71—73 and possibly even injury of the parts. In certain cases, as where the motor could not be made to idle slowly enough, it might even be impossible to shift to "forward" or "reverse."

To prevent this clashing, the brake must be applied whenever the clutch is in "neutral" and must, of course, be released when the clutch is moved to "forward" or "reverse" positions. This is accomplished, completely automatically, by the arrangement of the present invention now to be described.

By the arrangement of Fig. 2, it will be seen that the shifter shaft 81 has an operating lever 112, fixed on the outer end thereof by means of a key 113 and cap screw, lock washer, and retaining washer 114, 116 and 117, respectively. One end of the operating lever 112 is pivotally connected, as by means of a pin 118, to a push-pull rod 115 which may be suitably connected to a shifting lever (not shown) at some spot convenient for the locomotive operator. Thus, it will be seen that limited pivotal movement of the operating lever 112 will move the clutch through yoke 78, into "forward" and "reverse" positions in which the clutch is engaged with one or the other of the gears 56, 57 and a "neutral" position in which the clutch is engaged with neither, as shown in Fig. 4.

Linkage and cam means for applying and releasing the brake automatically in accordance with the position of the operating lever 112 will now be described.

As shown in Fig. 2, the end of lever 112, remote from the pin 118, has a cam head 119 on the end of it. This cam head is shown greatly enlarged, and reversed, in Fig. 5, where it will be seen that it includes a pair of cam surfaces 119a and 119b having between them a raised cam surface 119c. Returning now to Fig. 2, it will be seen that the cam follower, engaging this cam head, is a barrel shaped roller 121 held by set screw 122 onto the end of an auxiliary lever 123, which is pivoted as at 124 between a pair of outstanding ears 126, 126 of a bracket held onto the housing by cap screws 127. The opposite end of the auxiliary lever 123, as shown in both Figs. 2 and 4, has an adjusting screw 128 threadedly engaged therewith and held in place by a lock nut 129. This adjusting screw bears upon the head 106 and applies braking pressure at the proper times.

When the operating lever 112 is in "neutral," so as to hold the clutch 66 in the Fig. 4 position, the cam follower 121 will be riding on the high cam surface 119c, as shown in solid lines in Fig. 5. This will thrust the auxiliary lever 123 counter-clockwise (Fig. 2) to exert braking effort on the head 106 of the extension 104, thereby applying the brake as shown in Fig. 4. This will prevent the gears 56 and 57 from rotating under the urgence of the torque converter when the input vane assembly is rotating at idling speeds, or even above depending on the strength built into the brake, so that the operating lever 112 may be easily moved to "forward" or "reverse" positions without clashing. At these positions the cam follower 121 will be engaged by one or the other of the low cam surfaces 119a and 119b as shown in broken lines in Fig. 5, thereby permitting the auxiliary lever 123 to be moved clockwise (Fig. 2) by the return spring 111. Thus, in the released position, the extension 104 will be moved outward its limit, that is until the pin 107 is bottomed in the slot 108, and until the stem 95 is moved out its limit, that is until the back surface of the head 97 engages the inner end 100 of the housing portion 93.

In summary, a simplified, inexpensive reversing mechanism is provided which is automatically operable to prevent clash of gearing when reversed and when used with a torque converter as, for instance, on a locomotive or underground mine service.

While one form in which the present invention may be embodied has been shown and described it will be understood that various modifications and variations thereof may be effected without departing from the spirit and scope of the invention as defined by the appended claims.

I claim:

1. In a reversing mechanism for use on the output side of a torque converter, a housing having driving and driven shafts rotatably journaled therewithin, a pair of gears mounted in spaced relation with one another on said driven shaft and rotatable independently thereof, gear means driven by said driving shaft and meshed respectively with each of said pair of gears for interconnecting the latter and driving them in opposite directions, a jaw clutch reciprocably splined to said driven shaft between said pair of gears, said jaw clutch having oppositely disposed sets of jaw teeth engageable when shifted along said driven shaft with one or the other corresponding sets of jaw teeth on said pair of gears, a brake member reciprocably mounted in said housing and frictionally engageable with one of said pair of gears, spring means acting between said housing and brake member urging the latter away from said gear, other spring means comprising part of said brake member and through which the braking load is applied, a shifter shaft pivotally mounted in said housing and carrying a shifter yoke operatively engaged with said clutch to move the latter to engage one or the other of said pair of gears, an operating lever mounted on said shifter shaft and pivotable therewith, an intermediate lever mounted on said housing for pivotal movement about an axis at right angles to the axis of said intermediate lever being engageable with said brake member to press the latter into engagement with said one gear, and cam and follower means acting between the other end of said intermediate lever and one end of said operating lever effective to pivot said intermediate lever to actuate the brake member whenever said operating lever is positioned to maintain said clutch in a neutral position between said pair of gears.

2. In a reversing mechanism for use on the output side of a torque converter, a housing having driving and driven shafts rotatably journaled therewithin, a pair of gears in axially spaced relation with one another on said driven shaft and rotatably journaled thereabout for rotation independently thereof, gear means driven by said driving shaft and meshed respectively with each of said pair of gears for interconnecting the latter and driving them in opposite directions, a clutch member reciprocably splined to said driven shaft for shifting movement between said pair of gears, said clutch member having oppositely disposed toothed portions engageable when shifted along said driven shaft with corresponding toothed portions on one or the other of said pair of gears, a brake member reciprocably mounted in said housing and engageable with an adjacent one of said pair of gears, spring means acting between said housing and brake member urging the latter away from said gear, a shifter shaft journaled for limited rotation in said housing and carrying a shifter yoke operatively engaged with said clutch member to move the latter to engage one or the other of said pair of gears, an operating lever mounted on said shifter shaft and pivotable therewith, another lever pivotally mounted on said housing, one end of the other lever being engageable with said brake member to press the latter into engagement with said adjacent gear, and cam and follower means acting between the other end of said other lever and one end of said operating lever effective to pivot said other lever to press the brake member against said adjacent gear whenever said operating lever is positioned to maintain said clutch in a neutral position between said pair of gears.

3. In a reversing mechanism for use on the output side of a torque converter or the like, a housing having a driven shaft rotatably journaled therewithin; a pair of gears independently rotatably journaled on said shaft, driving gear and shaft means between the torque converter and said gears for rotating the latter in opposite directions, a jaw clutch splined to said driven shaft between said gears and shiftable to three positions to engage toothed portions of either gear or neither, an operating member operatively connected to said clutch to move the latter to any one of said three positions, said housing having friction brake means movable toward and away from an adjacent one of said gears, and a linkage connecting said operating member and brake means effective to press the brake means against the adjacent gear in response to movement of the operating member in a direction to move said clutch member out of engagement with either gear, said linkage containing a spring through which the braking load is applied to the brake means.

4. In a reversing mechanism for use on the output side of a torque converter or the like, a housing having a driven shaft rotatably journaled therewithin; a pair of gears independently rotatably journaled on said shaft, driving gear and shaft means between the torque converter and said gears for rotating the latter in opposite directions, a jaw clutch splined to said driven shaft between said gears and shiftable to three positions to engage toothed portions of either gear or neither, an operating member operatively connected to said clutch to move the latter to any one of said three positions, said housing having friction brake means movable toward and away from an adjacent one of said gears, and a linkage connecting said operating member and brake means effective to press the brake means against the adjacent gear in response to movement of the operating member in a direction to move said clutch member out of engagement with either gear, said brake means including a stem, the end of which is engageable with the adjacent gear and which is journaled within the housing for movement toward and away from the gear, said stem having a separate exterior extension which is limitedly telescopical relative to the stem, a compression spring interposed between the stem and extension and through which the braking load is applied, and another compression spring acting between the housing and extension to urge the brake means out of engagement with said adjacent gear.

References Cited in the file of this patent

UNITED STATES PATENTS

| | | |
|---|---|---|
| 780,733 | Smith | Jan. 24, 1905 |
| 1,634,145 | Klausmeyer | June 28, 1927 |
| 2,094,278 | Morin | Sept. 28, 1937 |
| 2,180,470 | Jaeger | Nov. 21, 1939 |
| 2,192,439 | Gustafson | Mar. 5, 1940 |
| 2,218,314 | Johnson | Oct. 15, 1940 |
| 2,311,740 | Dodge | Feb. 23, 1943 |